United States Patent
Lin et al.

(10) Patent No.: US 10,906,091 B2
(45) Date of Patent: Feb. 2, 2021

(54) SAND CASTING MOLD AND METHOD OF FORMING SAND CASTING MOLD BY 3D PRINTING

(71) Applicant: Danfoss (Tianjin) Ltd., Tianjin (CN)

(72) Inventors: Jiangbo Lin, Tianjin (CN); Chengshui Huang, Tianjin (CN); Sanxiang Liu, Tianjin (CN); Xiaokun Ji, Tianjin (CN); Mickael Bron, Tianjin (CN)

(73) Assignee: Danfoss (Tianjin) Ltd., Tianjin (CN)

( * ) Notice: Subject to any disclaimer, the term of this patent is extended or adjusted under 35 U.S.C. 154(b) by 17 days.

(21) Appl. No.: 16/449,593

(22) Filed: Jun. 24, 2019

(65) Prior Publication Data
US 2020/0001351 A1    Jan. 2, 2020

(30) Foreign Application Priority Data
Jun. 29, 2018   (CN) .......................... 2018 1 0702895

(51) Int. Cl.
| | |
|---|---|
| *B22C 9/02* | (2006.01) |
| *B22C 9/08* | (2006.01) |
| *B33Y 10/00* | (2015.01) |
| *B33Y 80/00* | (2015.01) |

(52) U.S. Cl.
CPC ................. *B22C 9/02* (2013.01); *B22C 9/08* (2013.01); *B33Y 10/00* (2014.12); *B33Y 80/00* (2014.12)

(58) Field of Classification Search
CPC ................ B22C 9/02; B22C 9/08; B22C 9/22
See application file for complete search history.

(56) References Cited

U.S. PATENT DOCUMENTS

| | | | |
|---|---|---|---|
| 6,860,315 B2 * | 3/2005 | Williamson | ............. B22C 9/08 164/133 |
| 9,889,501 B2 * | 2/2018 | Boening | ............... F04D 29/023 |
| 2015/0000855 A1 | 1/2015 | Schwam | |

(Continued)

FOREIGN PATENT DOCUMENTS

| | | |
|---|---|---|
| CN | 205110693 U | 3/2016 |
| CN | 107350429 A | 11/2017 |
| CN | 107855475 A | 3/2018 |

(Continued)

*Primary Examiner* — Kevin E Yoon
(74) *Attorney, Agent, or Firm* — McCormick, Paulding & Huber PLLC

(57) ABSTRACT

A sand casting mold configured to cast a component and a method of forming the sand casting mold configured to cast the component by 3D printing are disclosed. The sand casting mold includes: an upper portion and a lower portion; a mold cavity defined by the upper portion and the lower portion; an upper sprue in the upper portion; a lower sprue which is in the lower portion and is in communication with the upper sprue; an upper runner which is in the upper portion, is separated from the upper sprue by a predetermined distance, and is in communication with the mold cavity; and a lower runner which is in the lower portion, is in communication with the lower sprue, is separated from the mold cavity in the lower portion, and has a first end in communication with the lower sprue, and a second end in communication with the upper runner. With the sand casting mold configured to cast the component according to the embodiments of the present invention, for example, a production cost can be reduced.

20 Claims, 6 Drawing Sheets

(56) References Cited

U.S. PATENT DOCUMENTS

2017/0106434 A1\* 4/2017 Wang ................... B22C 9/088

FOREIGN PATENT DOCUMENTS

| CN | 207239075 U | | 4/2018 | | |
|---|---|---|---|---|---|
| CN | 208450533 U | | 2/2019 | | |
| DE | 3918731 C1 | * | 11/1990 | ............... | B22C 9/08 |
| JP | 60064748 A | * | 4/1985 | ............... | B22C 9/08 |
| JP | 2000033459 A | | 2/2000 | | |

\* cited by examiner

SAND CASTING MOLD AND METHOD OF FORMING SAND CASTING MOLD BY 3D PRINTING

CROSS-REFERENCE TO RELATED APPLICATIONS

Applicant hereby claims foreign priority benefits under U.S.C. § 119 from Chinese Patent Application No. 201810702895.1 filed on Jun. 29, 2018, the content of which is incorporated by reference herein.

TECHNICAL FIELD

The present invention relates to the field of casting technology, and particularly to a sand casting mold configured to cast a component and a method of forming the sand casting mold by 3D printing.

BACKGROUND

A compression component is an important component of a scroll compressor, and is usually composed of a fixed scroll and an orbiting scroll which are assembled to be interdigitated. The compression component has a complicated structure and a manufacturing process of the compression component requires a high accuracy. Conventionally, the compression component is manufactured by casting a material such as a cast iron into a sand casting mold. In a conventional technology for manufacturing the sand casting mold, the sand casting mold is manufactured by a mold, and structures, such as a parting face and a vent hole, of the sand casting mold need to be designed in advance. If a structure of a product needs to be modified, the mold needs to be modified first and then the sand casting mold is manufactured. The continuous modification of the mold lengthens an entire casting cycle, and it is difficult to ensure molding requirements of the sand casting mold for the compression component with a complicated casted structure.

SUMMARY

An object of embodiments of the present invention is to provide a sand casting mold configured to cast a component, such as a fixed scroll and an orbiting scroll, and a method of forming the sand casting mold by 3D printing, thereby for example reducing a production cost.

Embodiments of the present invention provide a sand casting mold configured to cast a component, the sand casting mold comprising: an upper portion and a lower portion; a mold cavity defined by the upper portion and the lower portion; an upper sprue in the upper portion; a lower sprue which is in the lower portion and is in communication with the upper sprue; an upper runner which is in the upper portion, is separated from the upper sprue by a predetermined distance, and is in communication with the mold cavity; and a lower runner which is in the lower portion, is in communication with the lower sprue, is separated from the mold cavity in the lower portion, and has a first end in communication with the lower sprue, and a second end in communication with the upper runner.

According to embodiments of the present invention, the sand casting mold further comprises: a plurality of through holes in each of the upper portion and the lower portion; bolts passing through the through holes; and nuts fitted over threaded portions of the bolts, respectively.

According to embodiments of the present invention, the plurality of through holes in each of the upper portion and the lower portion are arranged around the mold cavity.

According to embodiments of the present invention, the lower sprue has a greater depth than that of the lower runner.

According to embodiments of the present invention, the upper runner comprises a first upper runner portion and a second upper runner portion which are respectively in communication with the mold cavity, and the lower runner comprises a first lower runner and a second lower runner, the first lower runner has a first end in communication with the lower sprue, and a second end in communication with the first upper runner portion, and the second lower runner has a first end in communication with the lower sprue, and a second end in communication with the second upper runner portion.

According to embodiments of the present invention, the sand casting mold further comprises: a feeder which is defined by the upper portion and the lower portion and is in communication with the mold cavity and the second upper runner portion, wherein a position where the feeder is connected to the second upper runner portion is farther from the upper sprue than a position where the mold cavity is connected to the second upper runner portion.

According to embodiments of the present invention, the first upper runner portion is in communication with the mold cavity through a first communication runner, and the second upper runner portion is in communication with the mold cavity through a second communication runner.

According to embodiments of the present invention, the first upper runner portion is in communication with the mold cavity through a first communication runner, and the second upper runner portion is in communication with the mold cavity through a second communication runner and is in communication with the feeder through a third communication runner.

According to embodiments of the present invention, each of the first upper runner portion and the second upper runner portion has two ends and an intermediate portion between the two ends, the intermediate portion of the first upper runner portion is connected to the first communication runner, and the intermediate portion of the second upper runner portion is connected to the second communication runner.

According to embodiments of the present invention, each of the first upper runner portion and the second upper runner portion has two ends and an intermediate portion between the two ends, the intermediate portion of the first upper runner portion is connected to the first communication runner, and the intermediate portion of the second upper runner portion is connected to the second communication runner and the third communication runner.

According to embodiments of the present invention, the sand casting mold further comprises: one or more vent holes formed in the upper portion, extending upwards from the mold cavity and/or the feeder, and passing through an upper surface of the upper portion.

According to embodiments of the present invention, the component is a compression component of a scroll compressor, the compression component has an end plate and a scroll extending from the end plate, and a portion of the mold cavity configured to form the end plate is formed substantially horizontally.

According to embodiments of the present invention, at least a part of the portion of the mold cavity configured to form the end plate is formed in the upper portion.

According to embodiments of the present invention, the portion of the mold cavity configured to form the end plate comprises a first part and a second part respectively formed in the upper portion and the lower portion.

According to embodiments of the present invention, each of the upper runner and the lower runner has an isosceles trapezoidal cross section.

According to embodiments of the present invention, the sand casting mold further comprises: a sprue cup which is in the upper portion and is in communication with the upper sprue.

According to embodiments of the present invention, the upper runner comprises an upper groove formed in a bottom of the upper portion, the lower runner comprises a lower groove formed in a top of the lower portion, and when viewed in a vertical direction, the second end of the lower runner overlaps at least partially with an end of the upper runner.

According to embodiments of the present invention, each of the upper portion and the lower portion is formed in a single process by a 3D printing technology.

Embodiments of the present invention further provide a method of forming a sand casting mold configured to cast a component by 3D printing, the method comprising steps of: forming, by 3D printing, an upper portion of the sand casting mold to form an upper mold cavity portion, an upper sprue, and an upper runner which is separated from the upper sprue by a predetermined distance and is in communication with the upper mold cavity portion; forming, by 3D printing, a lower portion of the sand casting mold to form a lower mold cavity portion, a lower sprue, and a lower runner which is in communication with the lower sprue and is separated from the lower mold cavity portion; and assembling the upper portion and the lower portion together so that the upper mold cavity portion and the lower mold cavity portion form a mold cavity, wherein the lower sprue is in communication with the upper sprue, and the lower runner has a first end in communication with the lower sprue, and a second end in communication with the upper runner.

According to embodiments of the present invention, the lower sprue has a greater depth than that of the lower runner.

According to embodiments of the present invention, the upper runner comprises a first upper runner portion and a second upper runner portion which are respectively in communication with the mold cavity, and the lower runner comprises a first lower runner and a second lower runner, the first lower runner has a first end in communication with the lower sprue, and a second end in communication with the first upper runner portion, and the second lower runner has a first end in communication with the lower sprue, and a second end in communication with the second upper runner portion.

According to embodiments of the present invention, the step of forming, by 3D printing, the upper portion comprises a step of forming an upper feeder portion, the step of forming, by 3D printing, the lower portion comprises a step of forming a lower feeder portion. The upper feeder portion and the lower feeder portion form a feeder, the feeder is in communication with the mold cavity and the second upper runner portion, and a position where the feeder is connected to the second upper runner portion is farther from the upper sprue than a position where the mold cavity is connected to the second upper runner portion.

According to embodiments of the present invention, the first upper runner portion is in communication with the mold cavity through a first communication runner, and the second upper runner portion is in communication with the mold cavity through a second communication runner.

According to embodiments of the present invention, the first upper runner portion is in communication with the mold cavity through a first communication runner, and the second upper runner portion is in communication with the mold cavity through a second communication runner and is in communication with the feeder through a third communication runner.

According to embodiments of the present invention, each of the first upper runner portion and the second upper runner portion has two ends and an intermediate portion between the two ends, the intermediate portion of the first upper runner portion is connected to the first communication runner, and the intermediate portion of the second upper runner portion is connected to the second communication runner.

According to embodiments of the present invention, each of the first upper runner portion and the second upper runner portion has two ends and an intermediate portion between the two ends, the intermediate portion of the first upper runner portion is connected to the first communication runner, and the intermediate portion of the second upper runner portion is connected to the second communication runner and the third communication runner.

According to embodiments of the present invention, the step of forming, by 3D printing, the upper portion comprises a step of forming one or more vent holes. The one or more vent holes extend upwards from the mold cavity and/or the feeder, and pass through an upper surface of the upper portion.

According to embodiments of the present invention, the upper runner comprises an upper groove formed in a bottom of the upper portion, the lower runner comprises a lower groove formed in a top of the lower portion, and when viewed in a vertical direction, the second end of the lower runner overlaps at least partially with an end of the upper runner.

According to embodiments of the present invention, the step of forming, by 3D printing, the upper portion comprises a step of forming a plurality of through holes, and the step of forming, by 3D printing, the lower portion comprises a step of forming a plurality of through holes.

According to embodiments of the present invention, the plurality of through holes in each of the upper portion and the lower portion are formed to be arranged around the mold cavity.

With the sand casting mold configured to cast a component and the method of forming the sand casting mold by 3D printing according to the embodiments of the present invention, for example, a production cost can be reduced.

DETAILED DESCRIPTION

Figure 2:
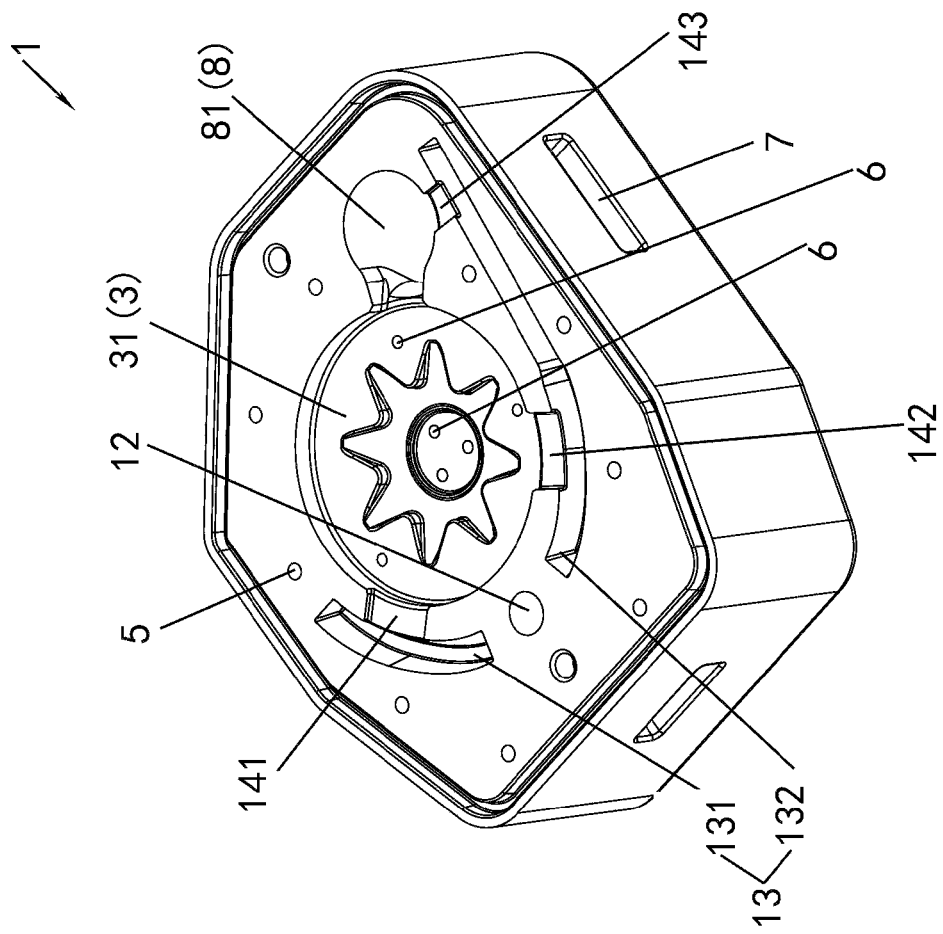
FIG. 2 is another schematic perspective view of the upper portion of the sand casting mold configured to cast the component according to the embodiments of the present invention.

Embodiments of the present invention will be described as follows in conjunction with the accompanying drawings.

Referring to FIGS. 1-10, a sand casting mold configured to cast a component according to embodiments of the present invention includes: an upper portion 1 and a lower portion 2 (that is, an upper sand casting mold portion 1 and a lower sand casting mold portion 2); a mold cavity 3 defined by the upper portion 1 and the lower portion 2; a sprue cup 11 in the upper portion 1; an upper sprue (or upper gate) 12 which is in the upper portion 1 and is in communication with the sprue cup 11; a lower sprue 22 which is in the lower portion 2 and is in communication with the upper sprue 12; an upper runner (or upper cross gate) 13 which is in the upper portion 1, is separated from the upper sprue 12 by a predetermined distance, and is in communication with the mold cavity 3; and a lower runner 23 which is in the lower portion 2, is in communication with the lower sprue 22, and is separated from the mold cavity 3 in the lower portion 2. The lower runner 23 has a first end in communication with the lower sprue 22, and a second end in communication with the upper runner 13. Each of the upper runner 13 and the lower runner 23 may have an isosceles trapezoidal cross section. The sprue cup 11 may have a cylindrical shape, a conical shape, or any other shape. Each of the upper sprue 12 and the lower sprue 22 may have a circular cross section, a square cross section, an elliptical cross section, or a cross section of any other shape. Each of the upper portion 1 and the lower portion 2 may be formed in a single process by a 3D printing method. In other words, each of the upper portion 1 and the lower portion 2 may be formed by an additive manufacturing method. There is a horizontal parting line or a horizontal parting face between the upper portion 1 and the lower portion 2. The upper runner 13 includes an upper groove formed in a bottom of the upper portion 1, the lower runner 23 includes a lower groove formed in a top of the lower portion 2, and when viewed in a vertical direction (i.e. when viewed downwards in a direction perpendicular to an top surface of the upper portion 1), the second end of the lower runner 23 overlaps at least partially with an end of the upper runner 13, and for example, the second end of the lower runner 23 overlaps completely with the end of the upper runner 13. Furthermore, the upper runner 13 may include a hole formed in the upper portion 1, the lower runner 23 may include a hole formed in the lower portion 2, and the upper runner 13 and the lower runner 23 may be in communication with each other through another hole. Each of the upper sprue 12 and the lower sprue 22 may extend substantially vertically or may be inclined at an angle to the vertical direction. For example, the angle is less than or equal to 30 degrees. Each of the upper runner 13 and the lower runner 23 may be disposed substantially horizontally or may be inclined upwards or downwards at an angle to a horizontal plane. For example, the angle is less than or equal to 30 degrees.

Referring to FIGS. 1-3, 5-8 and 10, according to embodiments of the present invention, the sand casting mold further includes: a plurality of through holes 5 in each of the upper portion 1 and the lower portion 2; bolts passing through the through holes 5; nuts fitted over threaded portions of the bolts, respectively; and washers disposed between heads of the bolts and one of the upper portion 1 and the lower portion 2 and between the nuts and the other of the upper portion 1 and the lower portion 2, respectively. The plurality of through holes 5 may be arranged around the mold cavity 3. The upper portion 1 and the lower portion 2 can be fixed together by means of the bolts to prevent a change of a relative position between the upper portion 1 and the lower portion 2 during casting.

Figure 7:
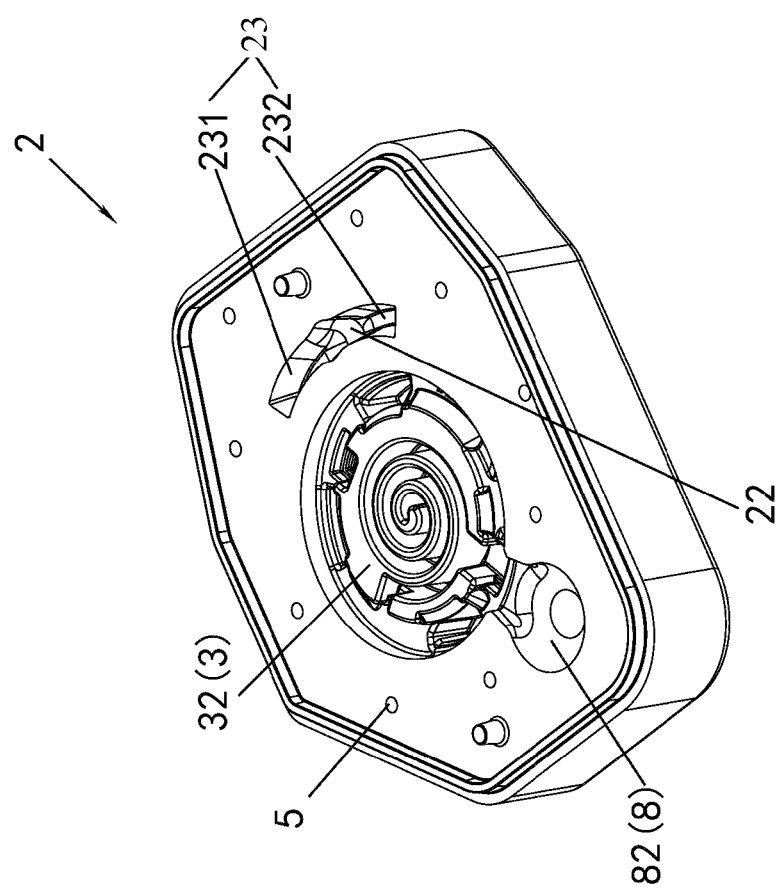
FIG. 7 is another schematic perspective view of the lower portion of the sand casting mold configured to cast the component according to the embodiments of the present invention.
Figure 6:
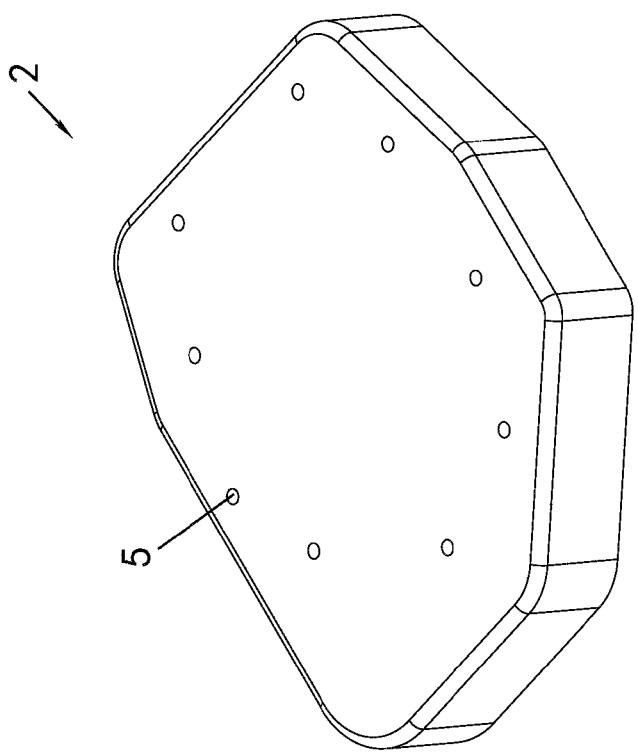
FIG. 6 is a schematic perspective view of a lower portion of the sand casting mold configured to cast the component according to the embodiments of the present invention.
Figure 9:
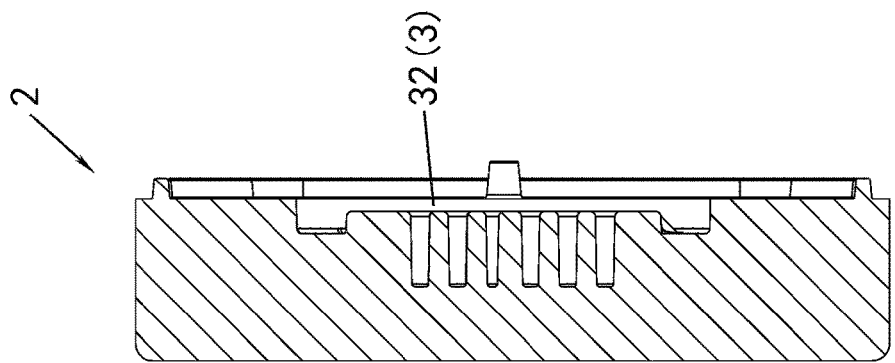
FIG. 9 is a schematic section view of the lower portion of the sand casting mold configured to cast the component according to the embodiments of the present invention, which is taken along the line BB in FIG. 8.
Figure 8:
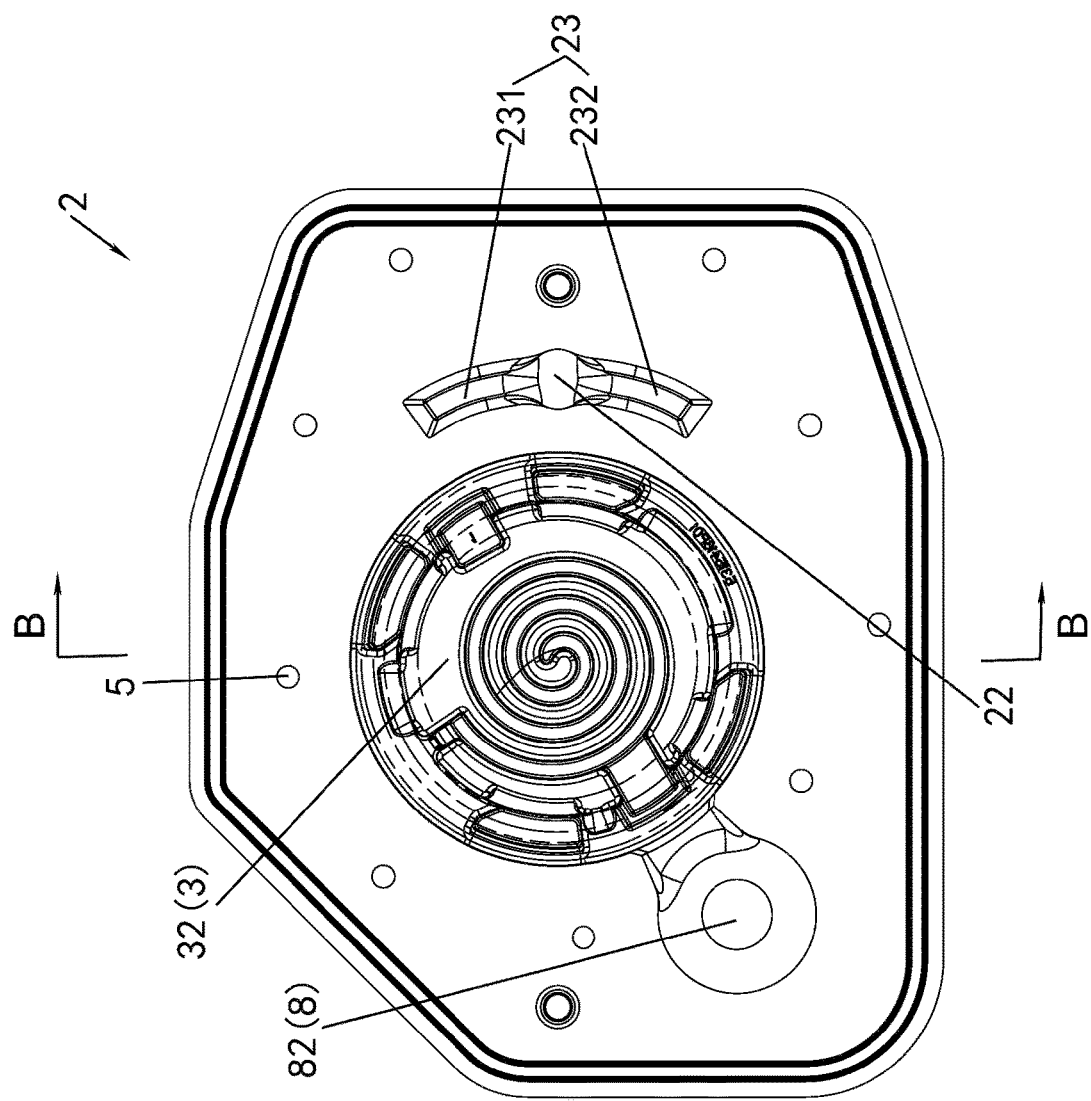
FIG. 8 is a schematic top view of the lower portion of the sand casting mold configured to cast the component according to the embodiments of the present invention.
Figure 10:
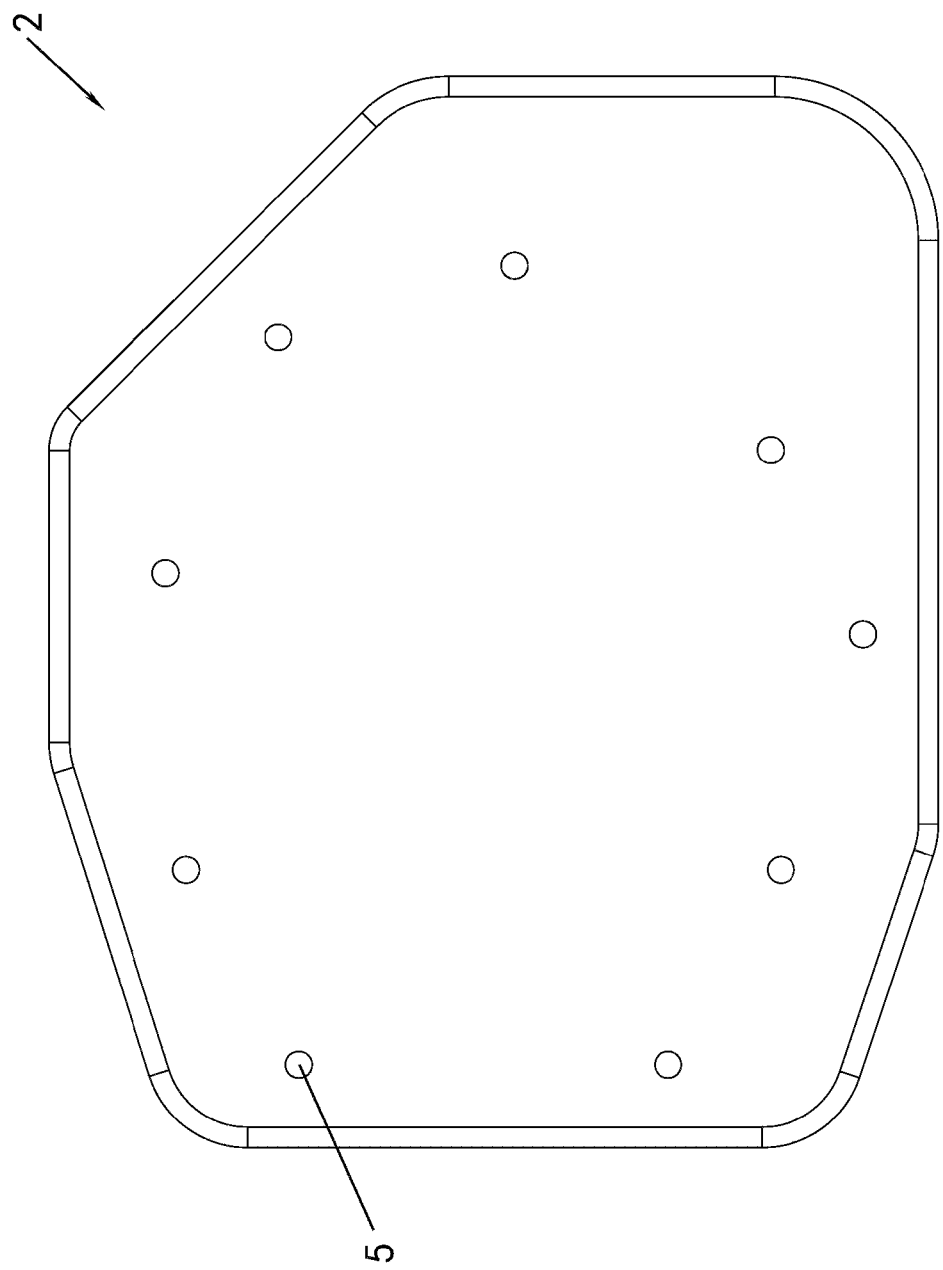
FIG. 10 is a schematic bottom view of the lower portion of the sand casting mold configured to cast the component according to the embodiments of the present invention.

Referring to FIGS. 7 and 8, according to embodiments of the present invention, the lower sprue 22 has a greater depth than that of the lower runner 23. Alternatively, the depth of the lower sprue 22 may be substantially equal to the depth of the lower runner 23.

Referring to FIGS. 2, 3, 7 and 8, according to embodiments of the present invention, the upper runner 13 includes a first upper runner portion 131 and a second upper runner portion 132 which are respectively in communication with the mold cavity 3, and the lower runner 23 includes a first lower runner 231 and a second lower runner 232, the first lower runner 231 has a first end in communication with the lower sprue 22, and a second end in communication with the first upper runner portion 131, and the second lower runner 232 has a first end in communication with the lower sprue 22, and a second end in communication with the second upper runner portion 132. Alternatively, the upper runner 13 may include only one upper runner, or may include three or more upper runners, and the lower runner 23 may include only one lower runner, or may include three or more lower runners.

Referring to FIGS. 2, 3, 7 and 8, according to embodiments of the present invention, the sand casting mold further includes: a feeder (or riser) 8 which is defined by the upper portion 1 and the lower portion 2 and is in communication with the mold cavity 3 and the second upper runner portion 132. A position where the feeder 8 is connected to the second upper runner portion 132 is farther from the upper sprue 12 than a position where the mold cavity 3 is connected to the second upper runner portion 132. According to an example of the present invention, the first upper runner portion 131 is in communication with the mold cavity 3 through a first communication runner 141, and the second upper runner portion 132 is in communication with the mold cavity 3 through a second communication runner 142. According to another example of the present invention, the first upper runner portion 131 is in communication with the mold cavity 3 through the first communication runner 141, and the second upper runner portion 132 is in communication with the mold cavity 3 through the second communication runner 142 and is in communication with the feeder 8 through a third communication runner 143. According to an example of the present invention, each of the first upper runner portion 131 and the second upper runner portion 132 has two ends and an intermediate portion between the two ends. The intermediate portion of the first upper runner portion 131 is connected to the first communication runner 141, and the intermediate portion of the second upper runner portion 132 is connected to the second communication runner 142. According to another example of the present invention, each of the first upper runner portion 131 and the second upper runner portion 132 has two ends and an intermediate portion between the two ends. The intermediate portion of the first upper runner portion 131 is connected to the first communication runner 141, and the intermediate portion of the second upper runner portion 132 is connected to the second communication runner 142 and the third communication runner 143. The feeder 8 may have a spherical shape, a cylindrical shape, or any other appropriate shape. The feeder 8 may include an exothermic feeder, an insulated feeder or a common feeder.

Referring to FIGS. 7 and 8, according to embodiments of the present invention, the sand casting mold further includes: a filter (not shown) disposed in an intersection of the lower sprue 22 and the upper runner 23. The filter may include a honeycomb filter screen, or a filter sheet to filter impurities during a casting process.

Referring to FIGS. 1-10, according to embodiments of the present invention, the component to be casted is a compression component of a scroll compressor, the compression component has an end plate and a scroll extending from the end plate, and a portion of the mold cavity 3 configured to form the end plate is formed substantially horizontally. At least a part of the portion of the mold cavity 3 configured to form the end plate is formed in the upper portion 1. According to the embodiment shown in the figures, the portion of the mold cavity 3 configured to form the end plate includes a first part and a second part respectively formed in the upper portion 1 and the lower portion 2.

Although in the above embodiments, the sand casting mold includes the upper portion 1 and the lower portion 2, but it may also include more than two portions.

Figure 1:
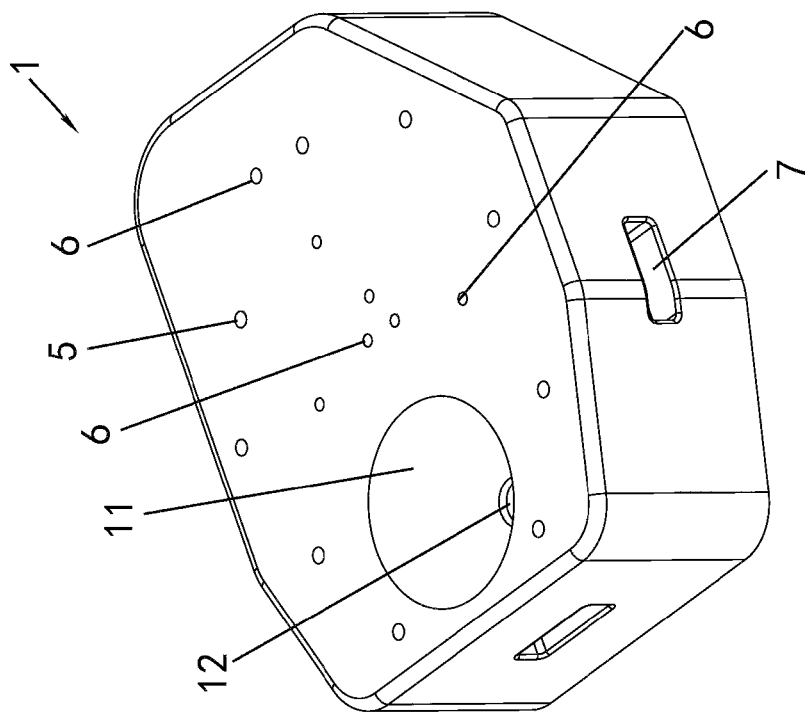
FIG. 1 is a schematic perspective view of an upper portion of a sand casting mold configured to cast a component according to embodiments of the present invention.
Figure 4:
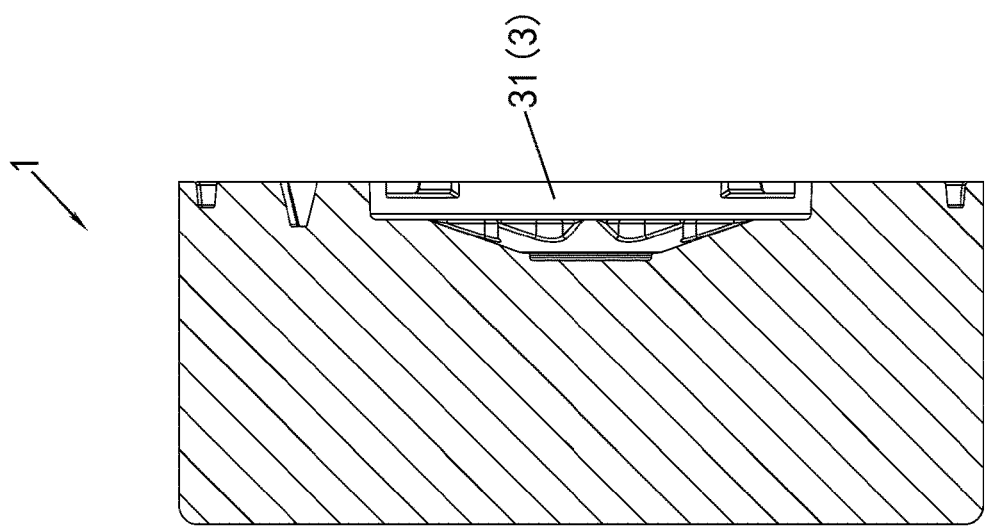
FIG. 4 is a schematic section view of the upper portion of the sand casting mold configured to cast the component according to the embodiments of the present invention, which is taken along the line AA in FIG. 3.
Figure 3:
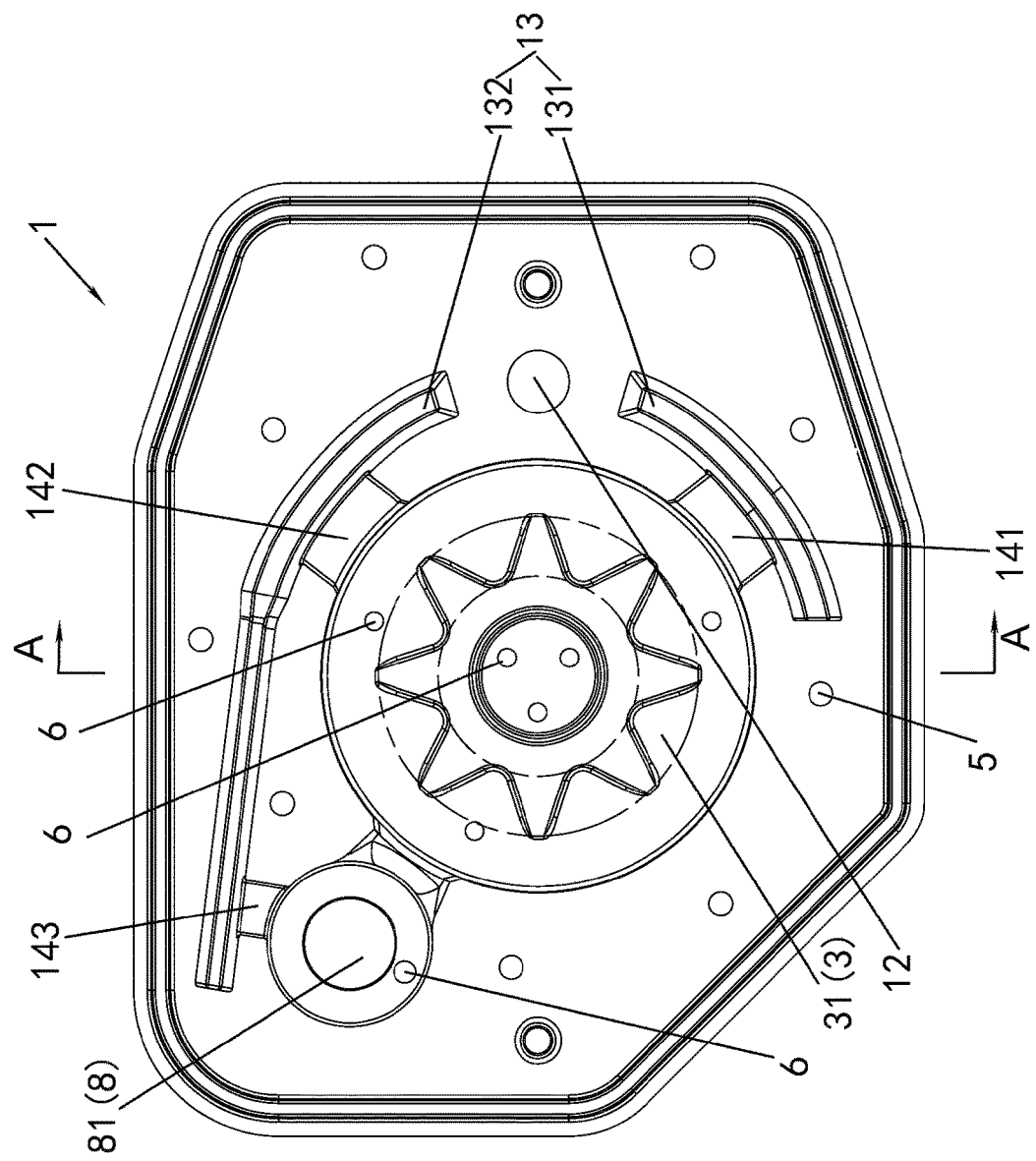
FIG. 3 is a schematic bottom view of the upper portion of the sand casting mold configured to cast the component according to the embodiments of the present invention.
Figure 5:
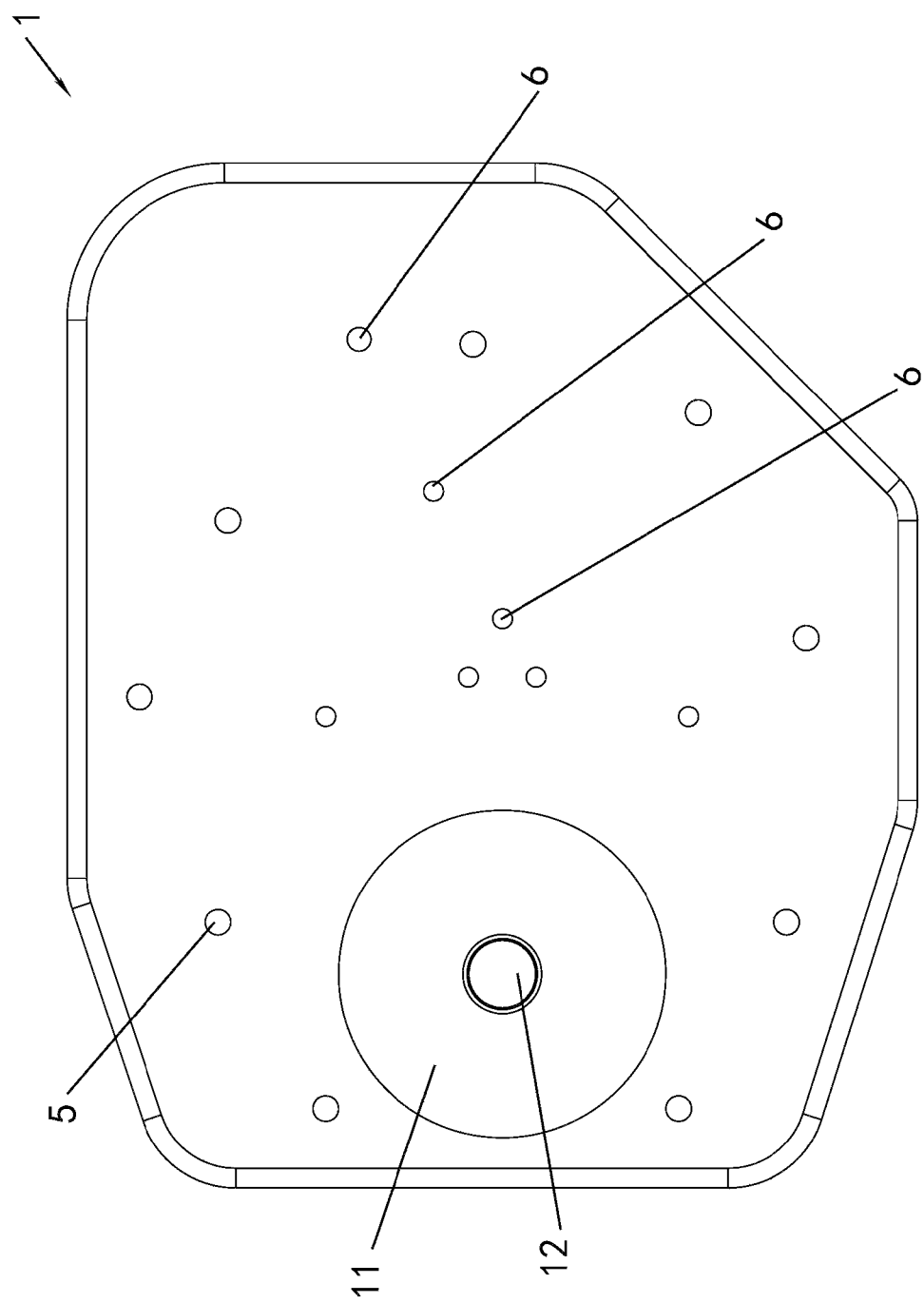
FIG. 5 is a schematic top view of the upper portion of the sand casting mold configured to cast the component according to the embodiments of the present invention.

According to embodiments of the present invention, referring to FIGS. 1-2, the sand casting mold further includes one or more vent holes 6 formed in the upper portion 1 to discharge gas from the mold cavity of the sand casting mold during casting. The one or more vent holes 6 extend upwards from the mold cavity 3 and/or the feeder 8, and pass through an upper surface of the upper portion 1. Further, one or more recesses 7 for carrying and assembling the upper portion 1 are formed on a side surface of the upper portion 1. Further, one or more recesses for carrying and assembling the lower portion may also be formed on a side surface of the lower portion 2. In addition, a surface of the sand casting mold defining the mold cavity 3 may be coated with a coating to decrease a roughness of a surface of a casted component.

Referring to FIGS. 1-10, according to embodiments of the present invention, there is provided a method of forming a sand casting mold configured to cast a component by 3D printing. The method may be used to form the sand casting mold described in the above embodiments. The method according to the embodiments of the present invention includes steps of: forming, by 3D printing, an upper portion 1 to form an upper mold cavity portion 31, an upper sprue 12, and an upper runner 13 which is separated from the upper sprue 12 by a predetermined distance and is in communication with the upper mold cavity portion 31; forming, by 3D printing, a lower portion 2 to form a lower mold cavity portion 32, a lower sprue 22, and a lower runner 23 which is in communication with the lower sprue 22 and is separated from the lower mold cavity portion 32; and assembling the upper portion 1 and the lower portion 2 together so that the upper mold cavity portion 31 and the lower mold cavity portion 32 form a mold cavity 3. The lower sprue 22 is in communication with the upper sprue 12, and the lower runner 23 has a first end in communication with the lower sprue 22, and a second end in communication with the upper runner 13.

Referring to FIGS. 2, 3, 7 and 8, according to embodiments of the present invention, in the step of forming, by 3D printing, the upper portion 1, an upper feeder portion 81 is also formed, and in the step of forming, by 3D printing, the lower portion 2, a lower feeder portion 82 is also formed, and the upper feeder portion 81 and the lower feeder portion 82 form a feeder 8, the feeder 8 is in communication with the mold cavity 3 and the second upper runner portion 13, and a position where the feeder 8 is connected to the second upper runner portion 13 is farther from the upper sprue 12 than a position where the mold cavity 3 is connected to the second upper runner portion 13.

According to embodiments of the present invention, referring to FIGS. 1-2, in the step of forming, by 3D printing, the upper portion 1, one or more vent holes 6 are also formed, and the one or more vent holes 6 extend upwards from the mold cavity 3 and/or the feeder 8, and pass through an upper surface of the upper portion 1.

According to embodiments of the present invention, referring to FIGS. 1-3, 5-8 and 10, in the step of forming, by 3D printing, the upper portion 1, a plurality of through holes 5 are also formed, and in the step of forming, by 3D printing, the lower portion 2, a plurality of through holes 5 are also formed. According to embodiments of the present invention, the plurality of through holes 5 in each of the upper portion 1 and the lower portion 2 are formed to be arranged around the mold cavity 3.

The sand casting mold formed by the method according to the embodiments of the present invention may have the same structure as the sand casting mold described in the above embodiments.

The sand casting mold according to the embodiments of the present invention may be applied in a gravity casting method and is suitable for casting any component or part.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A sand casting mold configured to cast a component, the sand casting mold comprising:
   an upper portion and a lower portion;
   a mold cavity defined by the upper portion and the lower portion;
   an upper sprue in the upper portion;
   a lower sprue which is in the lower portion and is in communication with the upper sprue;
   an upper runner which is in the upper portion, is separated from the upper sprue by a predetermined distance, and is in communication with the mold cavity; and
   a lower runner which is in the lower portion, is in communication with the lower sprue, is separated from the mold cavity in the lower portion, and has a first end in communication with the lower sprue, and a second end in communication with the upper runner.

2. The sand casting mold of claim 1, further comprising:
a plurality of through holes in each of the upper portion and the lower portion;
bolts passing through the through holes; and
nuts fitted over threaded portions of the bolts, respectively.

3. The sand casting mold of claim 2, wherein:
the plurality of through holes in each of the upper portion and the lower portion are arranged around the mold cavity.

4. The sand casting mold of claim 1, wherein:
the lower sprue has a greater depth than that of the lower runner.

5. The sand casting mold of claim 1, wherein:
the upper runner comprises a first upper runner portion and a second upper runner portion which are respectively in communication with the mold cavity, and
the lower runner comprises a first lower runner and a second lower runner, the first lower runner has a first end in communication with the lower sprue, and a second end in communication with the first upper runner portion, and the second lower runner has a first end in communication with the lower sprue, and a second end in communication with the second upper runner portion.

6. The sand casting mold of claim 5, further comprising:
a feeder which is defined by the upper portion and the lower portion and is in communication with the mold cavity and the second upper runner portion, wherein a position where the feeder is connected to the second upper runner portion is farther from the upper sprue than a position where the mold cavity is connected to the second upper runner portion.

7. The sand casting mold of claim 6, wherein:
the first upper runner portion is in communication with the mold cavity through a first communication runner, and the second upper runner portion is in communication with the mold cavity through a second communication runner and is in communication with the feeder through a third communication runner.

8. The sand casting mold of claim 7, wherein:
each of the first upper runner portion and the second upper runner portion has two ends and an intermediate portion between the two ends, the intermediate portion of the first upper runner portion is connected to the first communication runner, and the intermediate portion of the second upper runner portion is connected to the second communication runner and the third communication runner.

9. The sand casting mold of claim 8, further comprising:
one or more vent holes formed in the upper portion, extending upwards from the mold cavity and/or the feeder, and passing through an upper surface of the upper portion.

10. The sand casting mold of claim 5, wherein:
the first upper runner portion is in communication with the mold cavity through a first communication runner, and the second upper runner portion is in communication with the mold cavity through a second communication runner.

11. The sand casting mold of claim 10, wherein:
each of the first upper runner portion and the second upper runner portion has two ends and an intermediate portion between the two ends, the intermediate portion of the first upper runner portion is connected to the first communication runner, and the intermediate portion of the second upper runner portion is connected to the second communication runner.

12. The sand casting mold of claim 1, wherein:
the component is a compression component of a scroll compressor, the compression component has an end plate and a scroll extending from the end plate, and a portion of the mold cavity configured to form the end plate is formed substantially horizontally.

13. The sand casting mold of claim 12, wherein:
at least a part of the portion of the mold cavity configured to form the end plate is formed in the upper portion.

14. The sand casting mold of claim 13, wherein:
the portion of the mold cavity configured to form the end plate comprises a first part and a second part respectively formed in the upper portion and the lower portion.

15. The sand casting mold of claim 1, wherein:
each of the upper runner and the lower runner has an isosceles trapezoidal cross section.

16. The sand casting mold of claim 1, further comprising:
a sprue cup which is in the upper portion and is in communication with the upper sprue.

17. The sand casting mold of claim 1, wherein:
the upper runner comprises an upper groove formed in a bottom of the upper portion, the lower runner comprises a lower groove formed in a top of the lower portion, and when viewed in a vertical direction, the second end of the lower runner overlaps at least partially with an end of the upper runner.

18. The sand casting mold of claim 1, wherein:
each of the upper portion and the lower portion is formed in a single process by a 3D printing technology.

19. A method of forming a sand casting mold configured to cast a component by 3D printing, the method comprising steps of:
forming, by 3D printing, an upper portion of the sand casting mold to form an upper mold cavity portion, an upper sprue, and an upper runner which is separated from the upper sprue by a predetermined distance and is in communication with the upper mold cavity portion;
forming, by 3D printing, a lower portion of the sand casting mold to form a lower mold cavity portion, a lower sprue, and a lower runner which is in communication with the lower sprue and is separated from the lower mold cavity portion; and
assembling the upper portion and the lower portion together so that the upper mold cavity portion and the lower mold cavity portion form a mold cavity,
wherein the lower sprue is in communication with the upper sprue, and the lower runner has a first end in communication with the lower sprue, and a second end in communication with the upper runner.

20. The method of claim 19, wherein:
the upper runner comprises a first upper runner portion and a second upper runner portion which are respectively in communication with the mold cavity, and
the lower runner comprises a first lower runner and a second lower runner, the first lower runner has a first end in communication with the lower sprue, and a second end in communication with the first upper runner portion, and the second lower runner has a first end in communication with the lower sprue, and a second end in communication with the second upper runner portion.

* * * * *